(12) United States Patent
Takizawa et al.

(10) Patent No.: US 7,015,295 B1
(45) Date of Patent: Mar. 21, 2006

(54) PROCESS FOR PRODUCING ACRYLIC POLYMER

(75) Inventors: Youichi Takizawa, Sayama (JP); Tetsuya Yoshida, Sayama (JP)

(73) Assignee: Soken Chemical & Engineering Co., Ltd., Tokyo (JP)

(*) Notice: Subject to any disclaimer, the term of this patent is extended or adjusted under 35 U.S.C. 154(b) by 161 days.

(21) Appl. No.: 10/415,245

(22) PCT Filed: Oct. 27, 2000

(86) PCT No.: PCT/JP00/07575

§ 371 (c)(1),
(2), (4) Date: Apr. 25, 2003

(87) PCT Pub. No.: WO02/36645

PCT Pub. Date: May 10, 2002

(51) Int. Cl.
C08F 118/02 (2006.01)

(52) U.S. Cl. .................. 526/319; 526/73; 526/227; 526/230.5; 526/232.5

(58) Field of Classification Search .............. 526/319, 526/73, 227, 230.5, 232.5
See application file for complete search history.

(56) References Cited

U.S. PATENT DOCUMENTS 3,960,824 A    6/1976  Hicks
6,165,549 A *  12/2000 Takizawa et al. ........ 427/208.4

FOREIGN PATENT DOCUMENTS

| JP | (1978) 53-002589 B | 1/1978 |
| JP | (1980) 55-401 B | 1/1980 |
| JP | (1983) 58-087171 B | 5/1983 |
| JP | 2-55448 B | 11/1990 |
| JP | (1993) 5-132525 A | 5/1993 |
| JP | (1995) 7-126308 A | 6/1995 |
| JP | (1995) 7-330815 B | 12/1995 |
| JP | 2582510 B | 11/1996 |
| JP | 2752458 B | 2/1998 |
| JP | (1998) 10-152504 A | 6/1998 |
| JP | (1999) 11-049811 B | 2/1999 |
| JP | (1999) 11-255828 A | 9/1999 |
| JP | 2000-26507 A | 1/2000 |
| JP | 2000-159816 A | 6/2000 |

OTHER PUBLICATIONS

Patent Abstracts of Japan, Publication No. 2000-159816, Jun. 13, 2000, Inventors: Mizota Hirotoshi et al.
Patent Abstracts of Japan, Publication No. 2000-026507, Jan. 25, 2000, Inventors: Mizota Hirotoshi et al.
Patent Abstracts of Japan, Publication No. 11-255828, Sep. 21, 1999, Inventors: Mizota Hirotoshi et al.
Patent Abstracts of Japan, Publication No. 10-152504, Jun. 9, 1998, Inventors: Motoi Yasuaki et al.
Patent Abstracts of Japan, Publication No. 07-126308, May 16, 1995, Inventors: Kumagai Takashi et al.
Patent Abstracts of Japan, Publication No. 05-132525, May 28, 1993, Inventors: Chatani Michio et al.

* cited by examiner

*Primary Examiner*—Tatyana Zalukaeva
(74) *Attorney, Agent, or Firm*—The Webb Law Firm

(57) ABSTRACT

A method for bulk polymerization of monomers having a polymerizable unsaturated bond consisting mainly of an alkyl acrylate, which comprises adding a polymerization initiator having a 10 hours half-life temperature of 41.0° C. or below to the monomers in an amount of 0.0001 to 0.5 parts by weight based on 100 parts by weight of the monomers to initiate polymerization of the monomers, allowing after the reaction initiation the temperature of the reaction mixture to reach a maximum of 100 to 140° C. by the self-exotherm of the reaction system due to the consumption of the polymerization initiator, and thereby polymerizing 15 to 50% by weight of the monomers used.

23 Claims, No Drawings

PROCESS FOR PRODUCING ACRYLIC POLYMER

FIELD OF THE INVENTION

The present invention relates to a process for producing acrylic polymer in which substantially no solvent is used. More particularly, the invention relates to a process for stably carrying out a polymerization without going out of control in which substantially no solvent is used and a thermally decomposable polymerization initiator is used.

BACKGROUND OF THE INVENTION

Due to their excellent polymerizability, acrylic monomers can be polymerized by various reactions, such as solution polymerization, suspension polymerization, emulsion polymerization, photopolymerization and UV polymerization.

Many proposals have been made on the production of acrylic polymers; for example, JP-B-55(1980)/401 (the term "JP-B" as used herein means an "examined Japanese patent publication") discloses a method in which a mixture of an acrylic monomer and a mercaptan is heated at 20 to 200° C. in the presence of oxygen to carry out bulk polymerization; Japanese Patent No. 2582510 discloses a method in which a mixture of an acrylic monomer and a mercaptan that contains substantially no initiator is polymerized in a nitrogen atmosphere; JP-B-2(1990)/55448 discloses a method in which polymerization is conducted at high temperatures (around 150° C.) using an extrusion barrel instead of a batch reactor; JP-A-7(1995)/330815 (the term "JP-A" as used herein means an "unexamined published Japanese patent application") discloses a method in which a composition is irradiated with ultraviolet rays using optical fibers in a batch reactor and polymerized by pulse irradiation of ultraviolet rays; and JP-A-11(1999)/49811 discloses a method in which a composition is irradiated with ultraviolet rays in a batch reactor and simultaneously the temperature in the reactor is stepwise raised to carry out UV bulk polymerization.

However, the acrylic monomers have such high reactivity that drastic exotherm occurs in the reactor when those monomers are reacted in an industrially conventional batch reactor with the use of a thermally decomposable polymerization initiator. The heat of reaction is hard to remove from the reaction system so that it has been impossible to conduct bulk polymerization for acrylic monomers under effective control of the reaction when a thermally decomposable polymerization initiator is used.

To carry out the reaction in the barrel, the reaction temperature must be set to relatively higher region. Therefore the accuracy of temperature control decreases, which may cause the result that the resulting polymer has a broad molecular-weight distribution and dispersed molecular weights.

In the case of the reaction in the barrel equipped with an ultraviolet irradiation device, the temperature control is difficult so that the reaction cannot be controlled with high accuracy. Further, it will need considerable expenses to equip the batch reactor having an ultraviolet irradiation device with a heat-release system to control a greater exotherm caused by scaling up of production. As such, this method is not proper for mass production of acrylic polymers utilizing the existing equipment.

The bulk polymerization for acrylic monomers is in a way a preferable form of reaction since the resultant polymer contains no solvent, surface-active agent or the like so that separation of the solvent, etc. from the polymer is not needed and such properties as water resistance are not deteriorated by the surface-active agent or other components.

However, in the bulk polymerization using a thermally decomposable polymerization initiator, it is extremely difficult to control the exothermic polymerization because of the high reactivity of the monomers used. Therefore the polymerization often goes out of control. The runaway reaction is dangerous because the reaction can not be controlled and the condition of the reaction system rapidly changes, as rapid rise of the reaction temperature. Also, the resultant polymers tend to have broad molecular-weight distribution and low molecular weights.

On the bulk polymerization of acrylic monomers, JP-A-53(1978)/258.9 discloses a method for the preparation of thermosetting acrylic resins by polymerizing a mixture of a (meth)acrylate and a crosslinkable monomer, or a syrup thereof. In this method, prepolymerization is carried out in a reaction vessel at temperatures not higher than 150° C. to produce a prepolymer composition having a polymer ratio of at least 60%, and the prepolymer composition is taken out of the vessel and polymerized by multistage polymerization process in which the polymer ratio is increased by 10 to 60% in each stage. In Examples of the above publication, azobisisobutyronitrile and tert-butyl peroxylaurate are each used in an amount of about 0.01 to 0.3 parts by weight based on 100 parts by weight of the monomers. Azobisisobutyronitrile and tert-butyl peroxylaurate have a 10 hours half-life temperature of 66° C. and 98.3° C., respectively. When these thermally decomposable polymerization initiators of high 10 hours half-life temperatures are used at about 0.01 to 0.3 parts by weight based on the monomers, the temperature in the reaction system will rapidly increase as soon as the reaction initiates so that the reaction will run away if a high-performance cooling apparatus is not used. Therefore, this process requires a reactor equipped with a cooling apparatus having a sufficient cooling ability and also requires to carry out the polymerization in multi stages with sufficient cooling in each stage to prevent the runaway reaction. Thus, a high-performance equipment for cooling the reaction system is needed to be provided to carry out the above invention.

JP-A-58(1983)/87171 discloses a process for preparing acrylic pressure-sensitive adhesives having weight-average molecular weights of 100,000 to 600,000. This process comprises two stages in which acrylic monomers are polymerized at 40 to 120° C. with addition of a radical polymerization initiator in an amount of 0.00005 to 0.5 parts by weight based on 100 parts by weight of the acrylic monomers, the radical polymerization initiator having a half-life of 0.1 to 1000 hours at 70° C. and 0.1 to 5 hours at the initial polymerization temperature, respectively (1st stage), and the prepolymer is polymerized at a temperature higher than the 1st-stage temperature and within 100 to 200° C. with addition of a radical polymerization initiator in an amount of 0.0001 to 1 parts by weight that has a half-life of more than 1000 hours at 70° C. and at least 2 hours at the initial polymerization temperature, respectively (2nd stage). The polymerization initiators listed in the above publication include organic peroxides, such as acetyl peroxide, lauroyl peroxide, benzoyl peroxide, diisopropyl peroxide, di-2-ethylhexyl peroxydicarbonate, tert-butyl peroxy-2-ethylhexanoate, tert-butyl peroxylaurate and tert-butyl peroxyacetate; and azo compounds, such as azobisisobutyronitrile and 2,2'-azobis(2,4-dimethylvaleronitrile).

Although the polymerization initiators used in the above invention are thermal polymerization initiators, 10-hours half-life temperatures thereof are in the range from 43 to 102° C. There is no selectivity on these temperatures for the half-life of 10 hours of the thermal polymerization initiators. Rather, a characteristic aspect in the above invention is the amount of the thermal polymerization initiator, of which the above invention discloses the use in a very small to large quantity. The quantities of heat generated by using the thermal polymerization initiators may differ greatly depending on the activity of the initiator when controlling the reaction temperature within 40 to 120° C. For example, when tert-butyl peroxide or benzoyl peroxide is used as in the Examples, the temperature in the reaction system will rapidly increase as soon as the reaction initiates so that it is requisite for a high-performance cooling unit to control the heat generated in the reaction system.

Japanese Patent No. 2752458 discloses a method for the preparation of methacrylic polymers, which comprises placing a mixture of monomers containing methyl methacrylate in major proportion in a complete-mixing reactor, while adjusting the amount of dissolved oxygen in the monomers to 1 ppm or less, using a radical polymerization initiator with a half-life of 0.5 to 120 seconds at the polymerization temperature, stirring the mixture with a specified stirring force with controlling the mean residence time to make the half-life of the radical polymerization initiator and the mean residence time falling within a specific range.

The radical polymerization initiators used in the Examples of the above publication include 2,2-azobisisobutyronitrile, tert-butyl peroxyisobutyrate and lauroyl peroxide, all of which have a 10 hours half-life temperature over 41° C. Therefore, a high-performance cooling apparatus is used in the Examples of the above invention to prevent the runaway reaction; for example, a heat exchanger cooled by a −5° C. refrigerant is shown in FIG. 2.

As described above, it has been conventional in such bulk polymerization to remove the heat generated from the reaction system by means of a high-performance cooling unit in order to prevent the runaway reaction, with no technical idea on the selection of polymerization initiator. Accordingly, a problem of very expensive cooling unit has been encountered with these methods. Further, in the industrial-scale production of acrylic polymers where reaction hardly proceeds homogenously, it is very difficult to cool the entire reaction tank uniformly even by the use of a considerably high-performance cooling unit. Once the reaction goes out of control in part of the reactor, the runaway reaction could spread all over the reaction system so that such a high-performance cooling unit cannot be always applied to massive industrial production even if it enables stable reaction in the laboratory scale.

SUMMARY OF THE INVENTION

The object of the invention is to provide a method for bulk polymerization in which the reaction can be stably carried out without going out of control.

Particularly, the invention is concerned with a process for industrial production of acrylic polymer in which the reaction can be stably carried out without going out of control.

The invention provides a method for bulk polymerization of monomers having a polymerizable unsaturated bond consisting mainly of an alkyl acrylate, which comprises adding a polymerization initiator having a 10 hours half-life temperature of 41.0° C. or below to the monomers in an amount of 0.0001 to 0.5 parts by weight based on 100 parts by weight of the monomers to initiate polymerization of the monomers, allowing after the reaction initiation the temperature of the reaction mixture to reach a maximum of 100 to 140° C. by the self-exotherm of the reaction system due to the consumption of the polymerization initiator, and thereby polymerizing 15 to 50% by weight of the monomers used.

Further, the invention provides a method for bulk polymerization of monomers having a polymerizable unsaturated bond consisting mainly of an alkyl acrylate, which comprises adding a polymerization initiator having a 10-hours half-life temperature of 41.0° C. or below to the monomers in an amount of 0.0001 to 0.5 parts by weight based on 100 parts by weight of the monomers to initiate polymerization of the monomers, allowing, after the reaction initiation, the temperature of the reaction mixture to reach a maximum of 100 to 140° C. by the self-exotherm of the reaction system due to the consumption of the polymerization initiator, then rapidly cooling the reaction mixture to below 100° C. by newly adding the monomers, and thereby polymerizing 15 to 50% by weight of the monomers used for polymerization.

Further, in the invention an operation is preferablly carried out at least once which comprises after lowering the temperature of the reaction system to below 100° C. on consumption of the polymerization initiator, adding a polymerization initiator having a 10 hours half-life temperature of 41.0° C. or below in an amount of 0.0001 to 0.5 parts by weight based on 100 parts by weight of the monomers remaining in the reaction system to reinitiate the polymerization in the newly prepared reaction liquid, allowing after the reaction initiation the temperature of the reaction mixture to reach a maximum of 100 to 140° C. by the self-exotherm of the reaction system due to the consumption of the polymerization initiator, and thereby polymerizing 15 to 50% by weight of all the polymers and monomers.

The above use in small amounts of the polymerization initiator of low 10-hours half-life temperature prevents the runaway of bulk polymerization since the polymerization initiator is used up in a very short time.

A polymer ratio can be finally reached to 95.0% or more by repeating the above reactions.

DETAILED DESCRIPTION OF THE PREFERRED EMBODIMENTS

The present process for bulk polymerization will be described in detail hereinafter.

In the present process, monomers having a polymerizable unsaturated bond are used. The principal component of the monomers is an alkyl acrylate. Examples of such monomers having a polymerizable unsaturated bond include the following compounds:

alkyl acrylates, such as methyl acrylate, ethyl acrylate, propyl acrylate, butyl acrylate, pentyl acrylate, hexyl acrylate, 2-ethylhexyl acrylate, octyl acrylate, nonyl acrylate, decyl acrylate and dodecyl acrylate;

aryl acrylates, such as phenyl acrylate and benzyl acrylate;

alkoxyalkyl acrylates, such as methoxyethyl acrylate, ethoxyethyl acrylate, propoxyethyl acrylate, butoxyethyl acrylate and ethoxypropyl acrylate;

acrylic acids and salts thereof, such as acrylates of alkali metals;

methacrylic acids and salts thereof, such as methacrylates of alkali metals;

alkyl methacrylates, such as methyl methacrylate, ethyl methacrylate, propyl methacrylate, butyl methacrylate, pentyl methacrylate, hexyl methacrylate, 2-ethylhexyl methacrylate, octyl methacrylate, nonyl methacrylate, decyl methacrylate and dodecyl methacrylate;

aryl methacrylates, such as phenyl methacrylate and benzyl methacrylate;

alkoxyalkyl methacrylates, such as methoxyethyl methacrylate, ethoxyethyl methacrylate, propoxyethyl methacrylate, butoxyethyl methacrylate and ethoxypropyl methacrylate;

(poly)alkylene glycol diacrylates, such as ethylene glycol diacrylate, diethylene glycol diacrylate, triethylene glycol diacrylate, polyethylene glycol diacrylate, propylene glycol diacrylate, dipropylene glycol diacrylate and tripropylene glycol diacrylate;

(poly)alkylene glycol dimethacrylates, such as ethylene glycol dimethacrylate, diethylene glycol dimethacrylate, triethylene glycol dimethacrylate, polyethylene glycol dimethacrylate, propylene glycol dimethacrylate, dipropylene glycol dimethacrylate and tripropylene glycol dimethacrylate;

polyvalent acrylates, such as trimethylolpropane triacrylate;

polyvalent methacrylates, such as trimethylolpropane trimethacrylate;

acrylonitrile, methacrylonitrile, vinyl acetate and vinylidene chloride;

halogenated vinyl compounds, such as 2-chloroethyl acrylate and 2-chloroethyl methacrylate;

acrylates of alicyclic alcohols, such as cyclohexyl acrylate;

methacrylates of alicyclic alcohols, such as cyclohexyl methacrylate;

oxazoline group-containing polymerizable compounds, such as 2-vinyl-2-oxazoline, 2-vinyl-5-methyl-2-oxazoline and 2-isopropenyl-2-oxazoline;

aziridine group-containing polymerizable compounds, such as acryloylaziridine, methacryloylaziridine, 2-aziridinylethyl acrylate and 2-aziridinylethyl methacrylate;

epoxy group-containing vinyl monomers, such as allylglycidyl ether, glycidyl ether acrylate, glycidyl ether methacrylate, 2-ethylglycidyl ether acrylate and 2-ethylglycidyl ether methacrylate;

hydroxyl group-containing vinyl compounds, such as 2-hydroxyethyl acrylate, 2-hydroxyethyl methacrylate, 2-hydroxypropyl acrylate, monoesters of acrylic acids or methacrylic acids and polypropylene glycol or polyethylene glycol, and adducts of lactones and 2-hydroxyethyl (meth) acrylate;

fluorinated vinyl monomers, such as fluorinated alkyl methacrylates and fluorinated alkyl acrylates;

unsaturated carboxylic acids other than (meth)acrylic acid, such as itaconic acid, crotonic acid, maleic acid and fumaric acid, and salts, (partially) esterified compounds and anhydrides of such unsaturated carboxylic acids;

reactive halogen-containing vinyl monomers, such as 2-chloroethyl vinyl ether and vinyl monochloroacetate;

amido group-containing vinyl monomers, such as methacrylamide, N-methylol methacrylamide, N-methoxyethyl methacrylamide and N-butoxymethyl methacrylamide;

organosilicon group-containing vinyl compound monomers, such as vinyltrimethoxysilane, γ-methacryloxypropyl trimethoxysilane, allyltrimethoxysilane, trimethoxysilylpropylallylamine and 2-methoxyethoxytrimethoxysilane; and macromonomers (such as fluoromonomers, silicon-containing monomers, macromonomers, styrene and silicone), occurring by polymerization of compounds having vinyl group, that have radically polymerizable vinyl group in the terminal position of the monomer.

These polymerizable unsaturated compounds may be used either individually or in combination. Although the monomers having a polymerizable unsaturated bond may be liquid, solid or gaseous under reaction conditions, a liquid state is preferred for easy handling.

Of the compounds listed above, those difficult for bulk polymerization due to particularly high reaction rate can be stably bulk polymerized by the present process. For example, the present process is effective for bulk polymerization of a mixture of such monomers having high reaction rates as 2-ethylhexyl acrylate and acrylic acid. In the present process for bulk polymerization, the suitable proportion of the alkyl acrylate to the monomers having a polymerizable unsaturated bond is, which is not particularly limited thereto, 0.1 to 100 parts by weight, preferably 1 to 100 parts by weight based on 100 parts by weight of all the monomers.

In the present process, the monomers having an unsaturated bond are reacted substantially in the absence of a reaction solvent.

In the present process, the monomers having an unsaturated bond are polymerized with the use of a specific polymerization initiator.

The polymerization initiator used in the invention has a 10 hours half-life temperature of 41.0° C. or below, preferably from 20 to 37.0° C. as measured in toluene. In the invention, the temperature for the half-life of 10 hours is determined in toluene unless otherwise mentioned.

Examples of the polymerization initiator include isobutyryl peroxide (10-hours half-life temperature: 32.7° C.), α,α'-bis(neodecanoylperoxy)diisopropylbenzene (10-hours half-life temperature: 35.9° C.), cumyl peroxyneodecanoate (10-hours half-life temperature: 36.5° C.), di-n-propyl peroxydicarbonate (10-hours half-life temperature: 40.3° C.), diisopropyl peroxydicarbonate (10-hours half-life temperature: 40.5° C.), di-sec-butyl peroxydicarbonate (10-hours half-life temperature: 40.5° C.), 1,1,3,3-tetramethylbutyl peroxyneodecanoate (10-hours half-life temperature: 40.7° C.), bis(4-butylcyclohexyl) peroxydicarbonate (10-hours half-life temperature: 40.8° C.) and 2,2'-azobis(4-methoxy-2,4-dimethylvaleronitrile) (10-hours half-life temperature: 30.0° C.).

These polymerization initiators may be used either individually or in combination.

Of the above polymerization initiators, isobutyryl peroxide (10-hours half-life temperature: 32.7° C.), α,α'-bis(neodecanoylperoxy)diisopropylbenzene (10-hours half-life temperature: 35.9° C.), cumyl peroxyneodecanoate (10-hours half-life temperature: 36.5° C.) and 2,2'-azobis(4-methoxy-2,4-dimethylvaleronitrile) (10-hours half-life temperature: 30.0° C.) are preferably used. Particularly, 2,2'-azobis(4-methoxy-2,4-dimethylvaleronitrile) (10-hours half-life temperature: 30.0° C.) is preferred.

The above polymerization initiators are thermal polymerization initiators and have an extremely low 10 hours half-life temperature. For example, conventional polymerization initiators of tert-butyl peroxyisobutyrate, benzoyl peroxide and 2,2'-azobisisobutyronitrile have a 10 hours half-life temperature of 72.1° C., 74° C. and 66° C., respectively. When those thermal polymerization initiators of high 10 hours half-life temperatures are used in bulk polymerization, the reaction rapidly proceeds immediately after the initiation of reaction and it becomes very difficult to control the reaction.

In the invention, the polymerization is conducted with the use in small amounts of the thermal polymerization initiator of very low 10 hours half-life temperature instead of the above conventional ones having high 10 hours half-life temperatures.

Specifically, the polymerization initiator is used in amounts within the range of 0.0001 to 0.5 parts by weight, preferably 0.0005 to 0.1 parts by weight, more preferably 0.001 to 0.05 parts by weight based on 100 parts by weight of the monomers having a polymerizable unsaturated bond. The amount of polymerization initiator in the invention is very small as compared to the usual amounts of reaction initiator for bulk polymerization. Therefore the amount of monomers which react with the polymerization initiator is very small and the quantity of heat generated by the polymerization will be less than that emitted from the reaction system. Therefore once the reaction is initiated by heating the reaction system, external heating for the reaction system is generally no longer required. Once the reaction is initiated, exotherm generates by consumption of the polymerization initiator. However, since the use of the polymerization initiator is made in small amounts in the invention, the exotherm due to the reaction is small. Therefore the temperature of the reaction system does not increase rapidly to the extent of causing the runaway reaction. Further, the polymerization initiator has a low 10 hours half-life temperature so that it can be used up in a very short time. After complete consumption of the polymerization initiator, the temperature of the reactants will not increase any more. But in case where the polymerization initiator is used in an amount far below the lower limit, the polymerization may not proceed effectively since the polymerization initiator is consumed also by a polymerization inhibitor which is usually incorporated for the purpose of inhibiting the reaction of monomers in storage.

Once the reaction initiates, the temperature of the reactants reaches the maximum of 100 to 140° C., preferably 100 to 130° C. by the self-exotherm of the reaction system due to the consumption of the polymerization initiator, and the temperature is controlled so as not to exceed the upper limit. Usually, after the reaction system is heated or warmed to initiate the polymerization, the heating or warming is terminated and the temperature of the reaction system reaches the maximum of 100 to 140° C., preferably 100 to 130° C. by the self-exotherm of the reaction system according to the progress of the polymerization. In the invention, heating or cooling is not particularly required once the reaction is initiated, which, however does not restrict any heating or cooling to achieve the maximum temperature of the reaction system within the above range.

If the temperature of the reaction system exceeds 140° C., runaway reaction of thermal polymerization may be induced which is difficult to control. If the maximum temperature is lower than 100° C., the bulk polymerization cannot proceed to a desired polymerization ratio and the initiator remains in the reaction system to cause such problems as polymerization of the reactants during storage. When the reaction is conducted on a large scale, such as on a factory level where reaction monomers weigh over 1000 kg, the temperature of the reaction system near 150° C. will almost inevitably cause the runaway reaction even if a conventional cooling apparatus is used. The runaway reaction cannot be stopped unless a polymerization inhibitor is added in large amounts and will never be terminated when the reaction temperature has exceeded 180° C. That is, the conventional polymerization initiator having high 10 hours half-life temperature cannot be consumed completely at 100 to 140° C. so that the temperature of the reaction system increases to induce another thermal polymerization and thereby the temperature of the reaction system further increases, finally the reaction going out of control. This is how the runaway reaction occurs in bulk polymerization.

In the invention, the polymerization initiator having a low 10 hours half-life temperature of 4.1.0° C. or below is used in a small amount so that it can be used up in a short time as the temperature of the reaction system is rapidly increased to 100 to 140° C. mainly by the exotherm of polymerization. As a result, the maximum temperature in the reaction can be regulated to a controllable temperature of 140° C. or below.

The period for maintaining the maximum temperature in the range from 100 to 140° C. is preferably short. In the present process, the maximum temperature is maintained within the above range usually for 30 seconds to 2 minutes. When the period for maintaining the maximum temperature within the above range is far below the lower limit, the polymerization may hot proceed effectively in some cases, whereas when it is far above the upper limit, unfavorable polymers may be produced by thermal polymerization in some cases.

The polymerization as set forth above, in which the polymerization initiator selected from those listed above is used in a small amount, yields per one reaction cycle a partially polymerized composition in which 15 to 50% by weight of the monomers used are polymerized.

Following the above reaction cycle, the same reaction cycle can be repeatedly conducted by new addition of the polymerization initiator, and in each reaction cycles 15 to 50% by weight of all the polymers and monomers used in the cycle are polymerized. Finally, at least 95.0% of the total monomers used can be polymerized by repeating this procedure. Thus, the present process is capable of polymerizing almost all the monomers used. Further, the reaction in each cycle proceeds under mild conditions so that a short-chain polymer, which is a product of runaway bulk polymerization, is not generated in large quantities and the resulting polymer will be homogeneous with uniform molecular weight.

In the present process, the monomers are heated or warmed to the temperature enough for inducing the polymerization thereof upon addition of the polymerization initiator, and the polymerization initiator is added thereto in the specific amount to bring about the polymerization of these monomers. The temperature of monomers at the addition of polymerization initiator is usually 20 to 80° C., preferably 35 to 70° C., particularly preferably 40 to 65° C. The polymerization initiator is added to the heated or warmed monomers usually with stirring.

In the above case, the polymerization initiator is added to the heated monomers. But it shall be mentioned that the addition and heating of the monomers and the polymerization initiator can be carried out in an arbitrary order. For example, the monomers and the polymerization initiator may be mixed together and heated to the temperature inducing the reaction. Otherwise, as in the above case, the monomers may be heated to the temperature enough for inducing the reaction and the polymerization initiator may be admixed therewith.

In order to effectively initiate the polymerization, the monomers shall be heated or warmed to temperatures usually from 20 to 80° C., preferably from 35 to 70° C., particularly preferably from 40 to 65° C. Heating to the above temperatures enables effective activation of the polymerization initiator so that the polymerization proceeds efficiently.

Once the polymerization is initiated as mentioned above, the reaction proceeds by chain decomposition of the polymerization initiator with a rapid increase in temperature of the reaction system to 100 to 140° C. so that any heating or warming is not needed after the initiation of the reaction. Cooling is not necessary since the maximum temperature will not exceed 140° C. as long as the specified polymerization initiator is used within the conditions of the present invention. However, these do not restrict any temperature regulation by heating, warming or cooling to control the temperature of the reaction system in such stages.

After the initiation of polymerization, the reaction proceeds with a rapid increase in temperature of the reaction system by self-heating thereof. By the time when the temperature reaches the maximum in the range from 100 to 140° C., the polymerization initiator added will have been almost completely consumed and the exotherm caused by the progress of the reaction will decrease lower than the quantity of heat emitted out from the reaction system. Accordingly the temperature of the reaction system will no longer rise and gradually lowers below 100° C. on standing. In the invention, the reaction mixture at the maximum temperature may be cooled by standing. But since the reaction system is desirably cooled down below 100° C. as rapidly as possible, a cooling unit provided with the reactor may be used or unheated monomers may be added to the reaction system (referred to as the "monomer thinning" hereinafter) to lower the temperature of the reaction system below 100° C. in a short time once the temperature is reached the maximum. The temperature of the reaction system may be lowered below 100° C. by combining the use of cooling unit and the monomer thinning. The monomers for use in the monomer thinning are preferably the same as those contained in the reaction system, and are used in an amount of 10 to 50 parts by weight, preferably 20 to 30 parts by weight based on 100 parts by weight of the initially placed monomers in the reaction system.

The above reaction yields a partially polymerized syrup of 15 to 50% by weight of the initially placed monomers in the reaction system. The partially polymerized syrup thus obtained is a viscous liquid of 1 to 500 poise (as measured at 23° C. with a B-type viscometer).

In the present process, further operation can be conducted after cooling the partially polymerized syrup below 100° C. in which the polymerization initiator having a 10 hours half-life temperature of 41.0° C. or below is admixed in the specified small amount with the syrup, and the mixture is heated again to reinitiate the polymerization. By repeating this operation, a polymer ratio of the partially polymerized syrup is gradually increased, and finally at least 95.0% by weight of the monomers can be polymerized according to the present process.

In the above multistage polymerization, a viscosity of the partially polymerized syrup (a partially polymerized composition or finally polymers) is increased with the above operation repeated. For example, the viscosity usually increases about fivefold to tenfold by each operation, and the remaining monomers in the reaction system decrease.

In the present polymerization process, it is preferred that the monomers having a polymerizable unsaturated bond and a specific amount of the polymerization initiator are used in further combination with a chain transfer agent, such as normal dodecyl mercaptan, butyl mercaptan, 3-mercaptopropionic acid, thioglycolic acid and thioglycolate. The chain transfer agent is used in an amount within 0.001 to 10 parts by weight, preferably within 0.01 to 0.5 parts by weight based on 100 parts by weight of the monomers.

In the present process, the polymerization is preferably carried out with stirring and also preferably in an inert gas atmosphere such as nitrogen. Further, since the oxygen dissolved in the monomers may hinder the progress of the reaction, it is preferably removed from the monomers prior to initiating the reaction.

According to the invention, the specific polymerization initiator of low 10-hours half-life temperature is used in the small amount to regulate the maximum temperature of the reactants within the range of 100 to 140° C., preferably 100 to 130° C. by mainly utilizing the heat generated by polymerization so that the bulk polymerization can proceed under mild conditions without going out of control.

POSSIBILITY FOR INDUSTRIAL APPLICATION

The invention provides a method for bulk polymerization of monomers having a polymerizable unsaturated bond, in which a polymerization initiator of very low 10 hours half-life temperature is used in a small amount, and after the polymerization is initiated by the polymerization initiator the temperature of the reaction system is rapidly reached a maximum of 100 to 140° C. by mainly utilizing the reaction heat according to proceeding the exothermic reaction and the polymerization initiator is completely consumed, to thereby polymerize 15 to 50% by weight of the monomers used.

As such, in the invention, a polymerization is carried out selectively using a polymerization initiator of specific 10-hours half-life temperature distinguished from other various polymerization initiators. Accordingly, bulk polymerization can be carried out with no runaway reaction by using a conventional apparatus without any external cooling or heating in usual conditions.

EXAMPLES

The present invention will be described in more detail hereinafter by the following Examples, which is not to limit the scope of the invention in any way.

Example 1

Into a 0.2 liter four-necked flask equipped with a stirrer, a thermometer, a nitrogen introduction tube and a cooling tube were placed 92 g of 2-ethylhexyl acrylate (2-EHA), 8 g of acrylic acid (AA) and 0.06 g of normal dodecyl mercaptan, and they were heated in nitrogen flow until the temperature reached 50° C.

Then a polymerization initiator of 2,2'-azobis(4-methoxy-2,4-dimethylvaleronitrile), having a 10-hours half-life temperature of 30° C. as measured in toluene, was added in an amount of 0.0025 g with stirring and uniformly mixed with the above monomers.

Stirring was continuously conducted after the addition of polymerization initiator, and a temperature rise due to the heat of polymerization was confirmed 3 minutes later. The reaction was allowed to proceed with exotherm without cooling the flask, and the temperature of the reaction system reached 118° C. As a result of further stirring, the polymerization initiator added to the reaction system was completely consumed. Upon consumption of the polymerization initiator, the temperature of the reaction system ceased to rise with no runaway reaction confirmed. Analysis of the polymerization initiator with respect to the reactants revealed that all the polymerization initiator added had been deactivated.

The temperature of the reaction system was rapidly cooled to 100° C. or below by means of an external cooling device with addition of cooling agents: 23 g of 2-EHA and 2 g of AA, both 25° C. External cooling was continuously carried out to obtain a partially polymerized syrup.

The partially polymerized syrup thus obtained was a viscous resin liquid of 50 poise in viscosity which contained a polymer portion at 28%.

Comparative Example 1

Polymerization was attempted in the same manner as in Example 1 except that the polymerization initiator was used in an amount of 0.00005 g. The result was that the reaction liquid did not generate exotherm in 30 minutes so that the polymerization did not occur.

Comparative Example 2

Polymerization was conducted in the same manner as in Example 1 except that the polymerization initiator was used in an amount of 2 g. The result was that the temperature of the reactants in the flask rose rapidly to 154° C. and further increased little by little. At the point where the temperature of the reactants reached 180° C., the reaction was forcedly discontinued by introducing a reaction inhibitor based on the judgment that further continuation should result in uncontrollable reaction.

Comparative Example 3

Polymerization was conducted in the same manner as in Example 1 except that a polymerization initiator of 2,2'-azobisisobutyronitrile that had a 10-hours half-life temperature of 66° C. was used in place of 2,2'-azobis(4-methoxy-2,4-dimethylvaleronitrile) with a 10-hours half-life temperature of 30° C. The result was that the temperature of the reactants in the flask rose rapidly to 158° C. and further increased little by little. At the point where the temperature of the reactants reached 180° C., the reaction was forcedly discontinued by introducing a reaction inhibitor based on the judgment that further continuation should result in uncontrollable reaction.

Comparative Example 4

Polymerization was conducted in the same manner as in Example 1 except that a polymerization initiator of benzoyl peroxide that had a 10-hours half-life temperature of 74° C. was used in place of 2,2'-azobis(4-methoxy-2,4-dimethylvaleronitrile) with a 10-hours half-life temperature of 30° C. The result was that the temperature of the reactants in the flask rose rapidly to 166° C. and further increased little by little. At the point where the temperature of the reactants reached 180° C., the reaction was forcedly discontinued by introducing a reaction inhibitor based on the judgment that further continuation should result in uncontrollable reaction.

Comparative Example 5

Polymerization was conducted in the same manner as in Example 1 except that no use was made of 2-EHA and AA cooled at 25° C. The result was that it took 20 minutes to cool the reactants down lower than 100° C., and the thermal polymerization further proceeded during that period to increase the viscosity of reaction product.

The partial polymer thus obtained was a viscous resin liquid of 74 poise viscosity which contained a polymer portion at 30%.

Example 2

The partially polymerized syrup obtained in Example 1 was cooled to 50° C. in flowing nitrogen by means of an external cooling device and by the monomer thinning, and 0.005 g of 2,2'-azobis(4-methoxy-2,4-dimethylvaleronitrile) was fed to be uniformly mixed with the syrup.

Stirring was continuously conducted after the addition of polymerization initiator, and a temperature rise due to the heat of polymerization was confirmed 3 minutes later. The reaction was allowed to proceed with exotherm without cooling the flask, and the temperature of the reaction system reached 117° C. As a result of further stirring, the polymerization initiator added to the reaction system was completely consumed. Upon consumption of the polymerization initiator, the temperature of the reaction system ceased to rise with no runaway reaction confirmed. Analysis of the polymerization initiator with respect to the reactants revealed that all the polymerization initiator added had been deactivated.

The temperature of the reaction system was rapidly cooled to 100° C. or below by means of an external cooling device with addition of cooling agents: 23 g of 2-EHA and 2 g of AA, both 25° C. External cooling was continuously carried out to obtain a partially polymerized syrup.

The partially polymerized syrup thus obtained was a viscous resin liquid of 310 poise in viscosity which contained a polymer portion at 50%.

What is claimed is:

1. A method for bulk polymerization of monomers having a polymerizable unsaturated bond consisting mainly of an alkyl acrylate, which comprises adding a polymerization initiator having 10 hours half life at the temperature of 41.0° C. or below to the monomers in an amount of 0.0001 to 0.5 parts by weight based on 100 parts by weight of the monomers to initiate polymerization of the monomers, allowing after the reaction initiation the temperature of the reaction mixture to reach a maximum of 100 to 140° C. by the self-exotherm of the reaction system due to the consumption of the polymerization initiator, and thereby polymerizing 15 to 50% by weight of the monomers used subsequently lowering the temperature of the reaction system to below 100° C., adding a polymerization initiator having a 10 hours half life at the temperature of 41° C. or below in an amount of 0.0001 to 0.5 parts by weight based on 100 parts by weight of the monomers remaining in the reaction system to reinitiate the polymerization in the newly prepared reaction liquid.

2. A method for bulk polymerization of monomers having a polymerizable unsaturated bond consisting mainly of an alkyl acrylate, which comprises adding a polymerization initiator having 10 hours half life at the temperature of 41.0° C. or below to the monomers in an amount of 0.0001 to 0.5 parts by weight based on 100 parts by weight of the monomers to initiate polymerization of the monomers, allowing after the reaction initiation the temperature of the reaction mixture to reach a maximum of 100 to 140° C. by the self-exotherm of the reaction system due to the consumption of the polymerization initiator, then rapidly cooling the reaction mixture to below 100° C. by newly adding the monomers, and thereby polymerizing 15 to 50% by weight of the monomers used, adding a polymerization initiator having a 10 hours half life at the temperature of 41° C. or below in an amount of 0.0001 to 0.5 parts by weight based on 100 parts by weight of the monomers remaining in the reaction system to reinitiate the polymerization in the newly prepared reaction liquid.

3. The method according to claim 1, which comprises heating or warming the monomers to 20 to 80° C., terminating the heating or warming after addition of the polymerization initiator to the heated monomers, and allowing the temperature of the reaction mixture to reach a maximum of 100 to 140° C. by the self-exotherm of the reaction system due to the consumption of the polymerization initiator.

4. The method according to claim 1, wherein the polymerization initiator having 10 hours half life at the temperature of 41.0° C. or below is at least one selected from the group consisting of isobutyryl peroxide, α,α'-bis(neodecanoylperoxy)diisopropylbenzene, cumyl peroxyneodecanoate, di-n-propyl peroxydicarbonate, diisopropyl peroxydicarbonate, di-sec-butyl peroxydicarbonate, 1,1,3,3-tetramethylbutyl peroxyneodecanoate, bis(4-butylcyclohexyl) peroxydicarbonate and 2,2'-azobis(4-methoxy-2,4-dimethylvaleronitrile).

5. The method according to claim 1, wherein the 10 hours half life of the polymerization initiator is in the temperature range from 20 to 41.0° C.

6. The method according to claim 1, wherein the polymerization initiator is added in the range from 0.0001 to 0.1 parts by weight based on 100 parts by weight of the monomers.

7. The method according to claim 1, wherein after the reaction initiation the temperature of the reaction mixture is allowed to reach a maximum of 100 to 140° C. by heat of the reaction due to the consumption of the polymerization initiator without any external heating or cooling of the reaction system.

8. The method according to claim 1, wherein the temperature of the reaction system due to the self-exotherm is maintained in the range from 100 to 140° C.

9. The method according to claim 1, wherein the 10 hours half life of the polymerization initiator is in the temperature range from 20 to 37.0° C.

10. The method according to claim 1, which comprises after the temperature of the reaction liquid reaching a maximum of 100 to 140° C., adding unheated monomers to the reaction liquid to rapidly cool the reaction liquid to 100° C. or below.

11. The method according to claim 1, wherein the operation is repeated to polymerize at least 95.0% by weight of all the monomers used.

12. The method according to claim 2, which comprises heating or warming the monomers to 20 to 80° C., terminating the heating or warming after addition of the polymerization initiator to the heated monomers, and allowing the temperature of the reaction mixture to reach a maximum of 100 to 140° C. by the self-exotherm of the reaction system due to the consumption of the polymerization initiator.

13. The method according to claim 2, wherein the polymerization initiator having 10 hours half life at the temperature of 41.0° C. or below is at least one selected from the group consisting of isobutyryl peroxide, α,α'-bis(neodecanoylperoxy)diisopropylbenzene, cumyl peroxyneodecanoate, di-n-propyl peroxydicarbonate, diisopropyl peroxydicarbonate, di-sec-butyl peroxydicarbonate, 1,1,3,3 tetramethylbutyl peroxyneodecanoate, bis(4-butylcyclohexyl) peroxydicarbonate and 2,2'-azobis(4-methoxy-2,4-dimethylvaleronitrile).

14. The method according to claim 2, wherein the 10 hours half life of the polymerization initiator is in the range from 20 to 41.0° C.

15. The method according to claim 2, wherein the polymerization initiator is added in the range from 0.0001 to 0.1 parts by weight based on 100 parts by weight of the monomers.

16. The method according to claim 2, wherein after the reaction initiation the temperature of the reaction mixture is allowed to reach a maximum of 100 to 140° C. by heat of the reaction due to the consumption of the polymerization initiator without any external heating or cooling of the reaction system.

17. The method according to claim 2, wherein the temperature of the reaction system due to the self-exotherm is maintained in the range from 100 to 140° C.

18. The method according to claim 1, wherein the temperature of the reaction system due to the self-exotherm is maintained in the range from 100 to 140° C.

19. The method according to claim 2, wherein the 10 hours half life of the polymerization initiator is in the temperature range from 20 to 37.0° C.

20. The method according to claim 1 wherein the 10 hours half life of the polymerization initiator is in the temperature range from 20 to 37.0° C.

21. The method according to claim 2, which comprises after the temperature of the reaction liquid reaching a maximum of 100 to 140° C., adding unheated monomers to the reaction liquid to rapidly cool the reaction liquid to 100° C. or below.

22. The method according to claim 1, which comprises after the temperature of the reaction liquid reaching a maximum of 100 to 140° C., adding unheated monomers to the reaction liquid to rapidly cool the reaction liquid to 100° C. or below.

23. The method according to claim 2, wherein the operation is repeated to polymerize at least 95.0% by weight of all the monomers used.

* * * * *